Patented Oct. 11, 1932

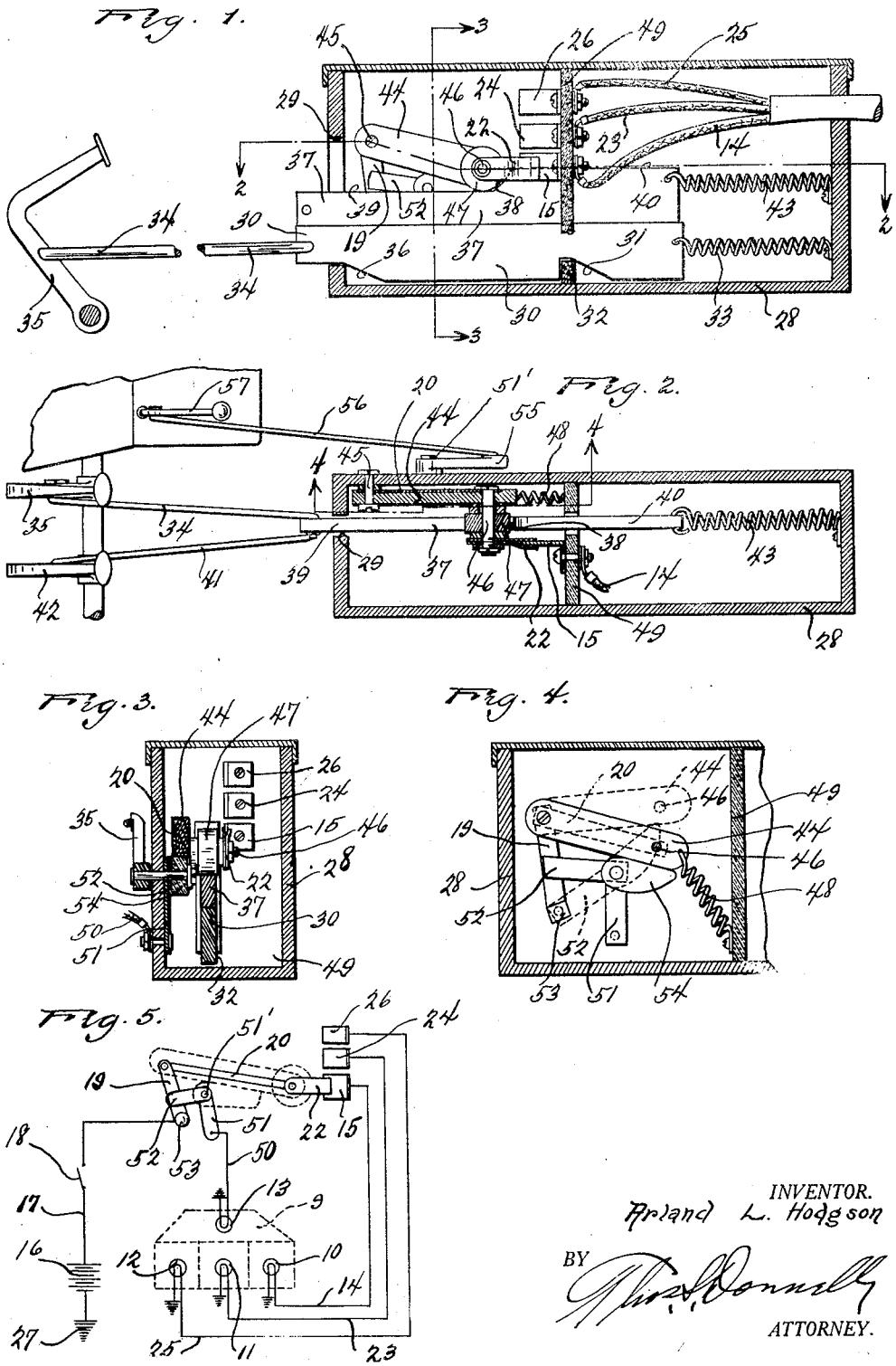

1,882,322

UNITED STATES PATENT OFFICE

ARLAND L. HODGSON, OF DETROIT, MICHIGAN

VEHICLE SIGNAL

Application filed May 29, 1930. Serial No. 457,249.

My invention relates to a new and useful improvement in a vehicle signal and particularly the switch mechanism used in conjunction therewith.

In a vehicle signal I propose to use indicating means such as a light or the like to indicate the intention of the driver as to making a stop and fully warn the drivers of following vehicles so that the following vehicle may not bump into the preceding vehicle which is stopping or about to stop. A person driving an automobile is frequently called upon to apply the brake without moving the clutch pedal, this application of the brake being effected merely for slowing up the speed of the vehicle. Frequently, also, the driver is required to move the clutch pedal so as to move the clutch out of operative position without necessarily applying the brake and without necessarily bringing the vehicle to a stop but resulting in the slowing up of the vehicle. When, however, the clutch and the brake are both rocked simultaneously the operator is bringing the vehicle to a stop and in each of these operations it is desired to warn the driver of the following vehicle of a change in operation which is about to be made. To accomplish this is one of the objects of the present invention.

Another object of the invention is the provision of a mechanism of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawing which forms a part of this specification and in which, Fig. 1 is a central vertical sectional view of a housing showing the switch operating mechanism in side elevation.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 2.

Fig. 5 is a diagrammatic view illustrating the wiring used in the invention.

In the invention I use a signal housing 9 having signal lights 10, 11, 12, and 13 mounted in separate non-communicating compartments and each suitably grounded. The light 10 is connected by the wire 14 to the contact 15. A battery 16 is connected by the wire 17 through the manually operated switch 18 with a metallic link 19 which is connected by the metallic arm 20 to the contact 22 which is adapted to engage the contact 15. The light 11 is connected by the wire 23 to the contact 24 which may also be engaged by the contact 22. The light 12 is connected by the wire 25 to the contact 26 which may also be engaged by the contact 22. The battery 16 is suitably grounded as at 27.

The switch mechanism is enclosed in a housing 28 having an opening 29 formed in one side thereof. Slidably mounted in the housing 28 and projectable through the opening 29 is a bar 30 having a notch formed in its undersurface provided with the inclined surface 31, a transverse bar 32 normally engaging in the notch. The upper surface of the bar 30 lies in a single plane.

A spring 33 serves to normally retain the bar 30 in the position shown in Fig. 1. The bar 30 is connected by the rod 34 to the pedal 35 which is used to operate the brakes of the vehicle. The forward end of the bar 30 is cut away to provide the inclined surface 36.

Slidably positioned on the upper surface of the bar 30 is a bar 37, the lower face of the bar 37 lying in a single plane. The forward end of the bar 37 is cut away to provide the inclined surface 38 which connects between the upper surface 39 of the cut away portion and the upper surface 40 of the unreduced portion of the bar 37. A rod 41 serves to connect the bar 37 with the clutch pedal 42 of the vehicle. A spring 43 serves to normally retain the bar 37 in the position shown in Fig. 1.

An arm 44 formed from insulating material is rockably mounted on the bolt 45 on the side wall of the housing 28 and serves to carry the member 20 which is connected by the stud 46 to the contact 22. A roller 47 is mounted on the stud 46 so as to lie in registration with the bar 37 and normally maintained in contact therewith by the spring 48. The contacts 15, 24, and 26 are mounted on a suitable partition 49 which is positioned in the housing 28.

Under normal conditions the contact 22 is in engagement with the contact 15 so that the circuit to the light bulb 10 is normally closed, the housing in which this light bulb is enclosed having some indicia to indicate the normal operation of the vehicle such as the word "Go" and the like.

When the operator applies the brake pedal of the vehicle, the bar 30 will be moved outwardly of the housing against the tension of the spring 33 and as the inclined surface 36 engages the front wall of the housing and the inclined surface 31 rides over the bar 32, the bar 30 will be elevated, thus raising the bar 37 so as to rock the contact 22 into position so that it engages the contact 24 thus closing the circuit to the light bulb 11. The compartment in which the light bulb 11 is positioned would have some such indicia as to indicate "Caution". Should the brake pedal be undisturbed and the operator rock the clutch pedal 42 to move the clutch to inoperative position, the bar 37 will be moved outwardly of the housing causing the roller 47 to ride upwardly on the inclined surface 38 and engage the surface 40 thus bringing the contact 22 into engagement with the contact 24. Thus it is seen that upon rocking either the brake pedal or the clutch pedal individually, the same signal is given to the drivers of following vehicles. Should both of the pedals be rocked simultaneously, the bars 30 and 37 would be moved outwardly of the housing and the contact 22 would be elevated to engage the contact 26 thus closing the circuit to the light bulb 12 which would have some indicia indicating the intentions of the driver to stop, such as the word "Stop".

The light bulb 13 is connected by the wire 50 to a metallic arm 51 which is mounted on a shaft 51' on which is fixedly mounted, so as to rock therewith, the metallic arm 52 which may be rocked to engage the stud 53 which forms a contact and to which the wire 17 serves to conduct electricity from the battery 16, this stud 53 projecting outwardly from one face of the link or arm 19. Fixedly mounted on the shaft 51' so as to rock therewith is the plate 54 which is in alignment with the arm 44. Fixedly mounted on the shaft 51' is the crank 55 connected by the rod 56 to the gear shift lever 57 and so arranged that when the gear shift lever is moved to effect a reversing or backing up of the vehicle the arm 44 will be rocked upwardly so as to bring the contact 22 into engagement with the contact 24 thus closing the circuit to the light bulb 11 which will indicate "Caution". At the same time the contact 53 will be engaged by the link 52 and the circuit to the light bulb 13 closed. The compartment in which the light bulb 13 is mounted will bear some indicating means to indicate that a backing up or reversing of the vehicle is to be effected. The arm 44 is rocked upwardly because of the engagement of the member 54 therewith when it rocks upwardly.

It is thus seen that I have provided a mechanism whereby a multiplicity of signals may be easily and quickly and automatically given by the operator of an automobile in performing the usual operations in operating a vehicle.

While I have illustrated and described the preferred form of structure of my invention, I do not wish to limit myself to the precise details of structure shown but desire to avail myself of such variations and modifications as may come within the scope of the appended claims.

Having thus described my invention what I claim as new and desire to secure by Letters Patent is:

1. In a device of the class described: a plurality of circuits; a plurality of stationary contacts each connected to one of said circuits; a movable contact adapted for engaging said stationary contacts severally, the engagement of said movable contacts with either of said stationary contacts closing its circuit; a supporting member for said movable contact; a slidable member having a cut-away portion for engaging at said cut away portion, said contact supporting member and adapted upon slidable movement in one direction for moving said contact supporting member to bring said movable contact into engagement with a stationary contact normally non-engaged by said movable contact.

2. In a device of the class described: a plurality of circuits; a plurality of stationary contacts each mounted in one of said circuits; a movable contact adapted for engaging said stationary contacts, the engagement of said movable contact with either of said stationary contacts effecting a closing of the circuit in which the stationary contact is mounted; a supporting member for supporting said movable contact; an upper slidable member having a cut away portion normally engaging at said cut away portion said supporting member and adapted upon slidable movement in one direction for moving said supporting member to bring said movable contact into engagement with a stationary contact normally non-engaged with said movable contact.

3. In a device of the class described: a plurality of circuits; a plurality of stationary contacts each mounted in one of said circuits; a movable contact adapted for engaging said stationary contacts, the engagement of said movable contact with either of said stationary contacts effecting a closing of the circuit in which the stationary contact is mounted; a supporting member for supporting said movable contact; an upper slidable member having a cut away portion normally engaging at said cut away portion said supporting member and adapted upon slidable movement in one direction for moving said supporting member to bring said movable contact into engagement with a stationary contact normally non-engaged with said movable contact; a lower slidable member adapted upon slidable movement in one direction for moving said upper slidable member and moving said movable contact into engagement with said stationary contact normally non-engaged thereby.

4. In a device of the class described: a plurality of circuits; a plurality of stationary contacts each mounted in one of said circuits; a movable contact adapted for engaging said stationary contacts, the engagement of said movable contact with either of said stationary contacts effecting a closing of the circuit in which the stationary contact is mounted; a supporting member for supporting said movable contact; an upper slidable member having a cut away portion normally engaging at said cut away portion, said supporting member and adapted upon slidable movement in one direction for moving said supporting member to bring said movable contact into engagement with a stationary contact normally non-engaged with said movable contact; and a lower slidable member engageable with said upper slidable member, the movement of said slidable members in one direction in unison effecting a further movement of said movable contact for bringing the same into engagement with still another stationary contact normally non-engaged thereby.

5. In a device of the class described: a plurality of circuits; a stationary contact in each of said circuits; a movable contact adapted upon engaging either of said stationary contacts for closing its circuit; a movable supporting member for supporting said movable contact; a second stationary contact in one of said circuits, the first mentioned stationary contact in said circuit being normally engaged by said movable contact; and means operable for moving said first mentioned movable contact out of engagement with the first mentioned contact normally engaged thereby into engagement with another of said first mentioned stationary contacts and simultaneously for moving said second mentioned movable contact into engagement with said second mentioned stationary contact.

In testimony whereof I have signed the foregoing specification.

ARLAND L. HODGSON.